United States Patent [19]
Wittmann et al.

[11] Patent Number: 5,628,389
[45] Date of Patent: May 13, 1997

[54] FRICTION CLUTCH

[75] Inventors: Christoph Wittmann, Bühl-Eisental; Wolfgang Reik, Bühl, both of Germany

[73] Assignee: LuK Lamellen und Kupplungsbau GmbH, Bühl, Germany

[21] Appl. No.: 480,646

[22] Filed: Jun. 7, 1995

[30] Foreign Application Priority Data

Jul. 20, 1994 [DE] Germany .......................... 44 25 589.6

[51] Int. Cl.⁶ .......................... F16D 13/75; F16D 13/71; F16D 13/50
[52] U.S. Cl. .......................... 192/70.25; 192/70.27; 192/89.23; 192/89.25; 192/111 A; 267/161
[58] Field of Search .......................... 192/70.25, 111 A, 192/89.23, 89.25, 52.6, 70.27, 107 C; 267/161, 162, 163, 181

[56] References Cited

U.S. PATENT DOCUMENTS 4,538,716  9/1985  Reik .................. 192/89.25 X

FOREIGN PATENT DOCUMENTS

| 4239289 | 5/1993 | Germany . |
| 4322677 | 1/1994 | Germany . |
| 4410837 | 3/1994 | Germany . |
| 4342390 | 6/1994 | Germany . |
| 4418026 | 12/1994 | Germany . |
| 2261923 | 6/1993 | United Kingdom ............... 192/111 A |

*Primary Examiner*—Richard M. Lorence
*Attorney, Agent, or Firm*—Darby & Darby

[57] ABSTRACT

A friction clutch wherein the pressure plate is urged against the adjacent friction linings of the clutch disc by a diaphragm spring which reacts against a seat at the inner side of the clutch housing and bears against the pressure plate, at least when the clutch is engaged. The diaphragm spring is of one piece with or carries a resilient device which reacts against ramps at the exposed side of the housing and urges the diaphragm spring toward the seat. The ramps and the seat form part of a unit which automatically compensates for wear upon the friction linings of the clutch disc.

30 Claims, 7 Drawing Sheets

FRICTION CLUTCH

BACKGROUND OF THE INVENTION

The invention relates to friction clutches in general, and more particularly to improvements in friction clutches which can be utilized with advantage in the power trains of motor vehicles, for example, to transmit torque from the camshaft or crankshaft of a combustion engine to the input shaft of a variable-speed transmission. Still more particularly, the invention relates to improvements in friction clutches of the type wherein at least one clutch spring is installed between a rotary housing and a pressure plate which shares the rotatary movements of and is movable axially of the housing. The clutch is engaged when the at least one spring is free to urge the pressure plate axially and away from the housing so that the pressure plate cooperates with a counterpressure plate to transmit torque to friction linings which are disposed between the two plates and form part of a rotary clutch plate or clutch disc. The counterpressure plate can form part of or can constitute a flywheel which receives torque from a prime mover (such as the engine of a motor vehicle) and transmits torque to the housing which, in turn, transmits torque to the pressure plate.

Friction clutches of the above outlined character are disclosed, for example, in published German patent applications Nos. 42 39 289, 43 22 677 and 43 42 390 as well as in unpublished German patent applications Nos. P 44 18 026.8, P 44 08 424.2 and P 44 108 37.0. The friction clutches which are disclosed in the aforementioned German patent applications are provided with automatic wear compensating units or systems, namely with systems which can compensate for wear developing upon the friction linings of the clutch discs as a result of repeated engagement and disengagement of the clutches. Such automatic compensation for wear ensures that the bias upon the pressure plate (i.e., the bias of the clutch spring or springs) in the engaged condition of the clutch remains at least substantially unchanged regardless of the ability of the pressure plate to move closer to the counterpressure plate as a result of wear upon the friction linings.

The friction clutches which are disclosed in the aforementioned German patent applications are or can be further equipped with resilient means which are designed to ensure a gradual reduction of torque during disengagement of the friction clutch, namely a gradual reduction of torque which the pressure plate and the counterpressure plate transmit to the friction linings of the clutch disc during each reduction of the bias of the clutch spring or clutch springs upon the pressure plate. For example, the resilient means can include one or more resilient elements which are interposed between the customary two sets of friction linings, namely a first set which is contacted by a friction face of the counterpressure plate and a second set which is contacted by a friction face of the pressure plate in the engaged condition of the clutch. The resilient element or elements tend to move the two sets of friction linings axially and away from each other and thus assist the disengagement of the clutch. Such disengagement takes place when the clutch spring or springs are permitted or caused to reduce the bias upon the pressure plate in a direction toward the counterpressure plate. The resilient elements can tend to move the two sets of friction linings axially and away from each other during each and every stage or only during certain (such as initial) stages of disengagement of the clutch.

The resilient elements between the two sets of friction linings can also perform useful functions during engagement of the friction clutch. Thus, when the clutch spring or clutch springs are caused to move the pressure plate axially and toward the counterpressure plate so that the friction faces of such plates begin to bear upon the adjacent sets of friction linings, the resilient elements are caused to gradually store energy in response to axial movement of the pressure plate toward the counterpressure plate following the initial contact between the friction faces and the respective sets of friction linings. In other words, the resilient elements cooperate with the clutch spring or clutch springs to ensure a gradual increase of the torque which the two plates can transmit to the friction linings, and the clutch disc embodying such friction linings can transmit torque to a driven part, e.g., to the input shaft of a variable-speed transmission in a motor vehicle. Friction clutches of the above outlined character have fulfilled the expectations in actual use.

OBJECTS OF THE INVENTION

An object of the invention is to provide a friction clutch which constitutes an improvement over and a further development of the aforediscussed previously disclosed friction clutches.

Another object of the invention is to provide a friction clutch which is less expensive than but just as satisfactory and just as versatile as heretofore known friction clutches.

A further object of the invention is to provide a novel and improved method of assembling a friction clutch which embodies means for automatically compensating for wear upon the friction linings of its clutch disc or clutch plate.

An additional object of the invention is to provide a friction clutch which comprises a relatively small number of component parts, which comprises relatively simple and inexpensive parts, and which can be utilized in existing power trains as a superior substitute for heretofore known friction clutches.

Still another object of the invention is to provide a novel and improved clutch spring for use in the above outlined improved friction clutch.

A further object of the invention is to provide a novel and improved highly versatily diaphragm spring for use in friction clutches of the above outlined character as well as in other types of friction clutches.

Another object of the invention is to provide a power train which employs the above outlined friction clutch and the above outlined diaphragm spring.

An additional object of the invention is to provide novel and improved resilient means for use in a friction clutch to ensure satisfactory operation of the means for automatically compensating for wear upon the friction linings and, if necessary, upon one or more other parts of the friction clutch.

SUMMARY OF THE INVENTION

One feature of the present invention resides in the provision of an engageable and disengageable friction cutch which can be utilized with advantage in the power trains of motor vehicles. The improved friction clutch comprises a cover or housing which is rotatable about a predetermined axis, a counterpressure plate (e.g., a flywheel which is driven by an output element of a prime mover such as a combustion engine and transmits torque to the housing) which is coaxial and is rotatable with the housing, and a pressure plate which is coaxial and is rotatable with the housing. The pressure plate is interposed between the counterpressure plate and the housing with limited freedom of axial movement relative to the housing toward and away from the counterpressure plate. The friction clutch further comprises a clutch disc or clutch plate (hereinafter called clutch disc) having friction linings disposed between the two plates and being subject to wear as a result of repeated engagement and disengagement of the clutch, a clutch spring which is interposed between the pressure plate and a seat assembly on the housing to clamp the friction linings between the two plates in the engaged condition of the clutch, means for automatically compensating for wear upon the friction linings including means for moving the spring axially of and relative to the housing, and resilient means provided on the spring and being operative to urge the spring against the seat assembly.

At least a portion of the resilient means can be of one piece with the clutch spring.

The seat assembly preferably comprises a fulcrum and the clutch spring is then tiltable relative to the fulcrum. Such fulcrum can form part of the compensating means and the moving means of the compensating means can include means for repeatedly advancing the fulcrum and the clutch spring toward the counterpressure plate through distances which are dependent upon and are a function of the extent of wear upon the friction linings.

The friction clutch further comprises means for disengaging the clutch against the opposition of the resilient means.

It is presently preferred to install the clutch spring between the seat assembly and the pressure plate with a degressive characteristic curve within the operating range of such spring.

The clutch spring is or can constitute a diaphragm spring having a conicity which changes at least during disengagement of the clutch as well as in the absence of axial movement in response to wear upon the friction linings. The resilient means is or can be operative to urge the spring against the seat assembly with a first force exceeding a second force which is generated by the spring as a result of a change of conicity during disengagement of the clutch. However, the second force preferably exceeds the first force at least during a portion of a change of conicity of the spring as a result of wear upon the friction linings.

The resilient means can include a plurality of elongated portions or sections in the form of hairpins, clips or the like.

In many instances, the clutch spring includes an energy storing annular main portion and the resilient means is or can be of one piece with such main portion of the clutch spring. The arrangement can be such that the resilient means includes a plurality of elongated portions or sections which are of one piece with a radially inner marginal portion of the main portion of the clutch spring.

In accordance with one presently preferred embodiment, the clutch spring includes an elastically deformable annular main portion and the resilient means includes a plurality of sections each having a first portion extending from the main portion at least substantially toward the common axis of the housing, the pressure plate and the counterpressure plate, a second portion extending substantially radially outwardly away from the axis, and an intermediate portion between the respective first and second portions and spaced apart from the main portion radially inwardly toward the axis.

In addition to the annular main portion, the clutch spring can comprise a plurality of resilient prongs extending from the main portion substantially radially inwardly toward the axis. The aforementioned sections of the resilient means can alternate with at least some of the prongs as seen in the circumferential direction of the main portion. The means for engaging and disengaging the clutch can include portions of the prongs, particularly the radially innermost free end portions of such prongs. The prongs can be distributed in such a way that they form a plurality of groups which are spaced apart from each other in the circumferential direction of the main portion of the clutch spring, and the sections of the resilient means can alternate with such groups of prongs. Each group or at least some of the groups can include two, three or four prongs, for example, three prongs.

The clutch spring can be provided with slots between at least some of the prongs and the respective (neighboring) sections of the resilient means.

As already mentioned above, each section of the resilient means can include a first portion extending from the main portion of the clutch spring substantially radially inwardly toward the axis and a second portion extending substantially radially outwardly from the axis toward the main portion. Each such section can be provided with a slot which is disposed between the respective first and second portions.

It is also possible to design at least some sections of the resilient means in such a way that they have first portions extending from the main portion of the clutch spring substantially radially inwardly toward the axis and second portions extending in a direction from the axis substantially radially outwardly toward the main portion. The second portions of such sections can be provided with enlarged free end portions (particularly end portions which are widened in the circumferential direction of the main portion) remote from the axis.

In accordance with another presently preferred embodiment, the resilient means comprises a plurality of sections each of which includes first and second tongues extending from the annular main portion of the clutch spring at least substantially radially inwardly toward the axis and spaced apart from each other in the circumferential direction of the main portion. Each such section further includes a third tongue which is disposed between the respective first and second tongues and extends at least substantially radially outwardly toward the main portion. Each of the first and second tongues has a radially inner end portion merging into a radially inner end portion of the respective third tongue. Each such section can be said to resemble the working end of a three-pronged fork.

The resilient means can include or constitute suitably trimmed portions of a converted metallic blank which constitutes the clutch spring.

The resilient means can include a plurality of stressed sections having free end portions bearing against that side of the housing or cover which faces away from the pressure plate. Such sections can be said to be elastically deformed in the direction of the common axis of the housing, pressure plate and counterpressure plate.

The improved clutch can comprise a plug-in connection or an analogous connection between the clutch spring and the housing, and the latter can be provided with windows or analogous openings for portions of the resilient means. Still further, the housing can be provided with ramps which are engaged by end portions of the aforementioned sections of the resilient means.

Another feature of the invention resides in the provision of a diaphragm spring which can be utilized with particular advantage in friction clutches and comprises an annular main portion, a plurality of prongs extending from the main portion at least substantially radially inwardly and together forming a plurality of groups spaced apart from each other in the circumferential direction of the main portion, and resilient means including sections which alternate with the groups in the circumferential direction of the main portion and each of which includes a first portion extending at least substantially radially inwardly from the main portion, a second portion extending at least substantially radially outward toward the main portion, and an intermediate portion connecting a radially inner end portion of the first portion with a radially inner end portion of the second portion. Each second portion of each section can have a radially outer end portion immediately or closely adjacent a radially inner marginal portion of the main portion.

It is also possible to rivet, bolt or otherwise separably affix the sections of the resilient means to the prongs of the clutch spring.

The improved combination of clutch spring and resilient means can be utilized in existing friction clutches as a superior substitute for heretofore known clutch springs.

The novel features which are considered as characteristic of the invention are set forth in particular in the appended claims. The improved friction clutch itself, however, both as to its construction and the mode of assembling and utilizing the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
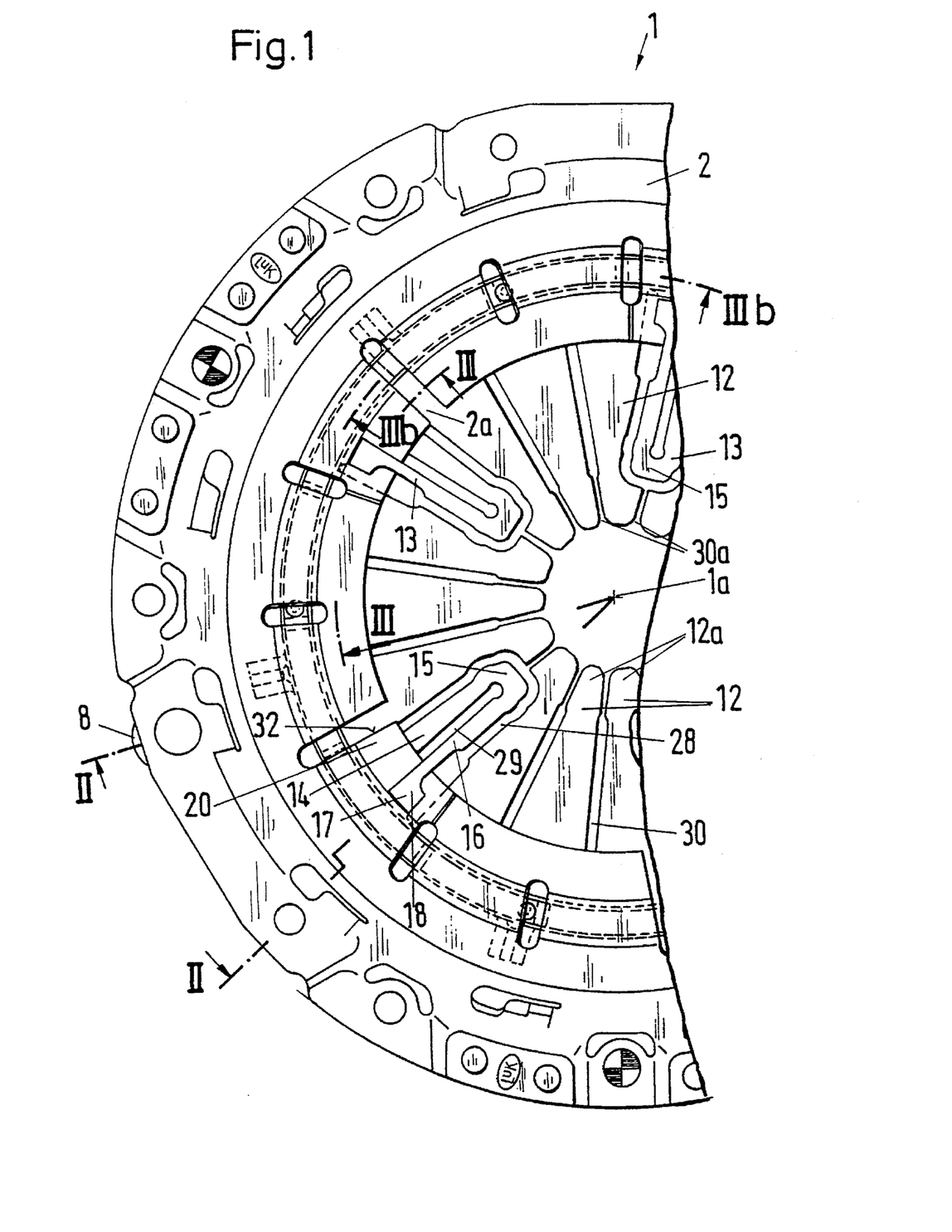
FIG. 1 is a fragmentary rear elevational view of a friction clutch which embodies one form of the present invention.
Figure 2:
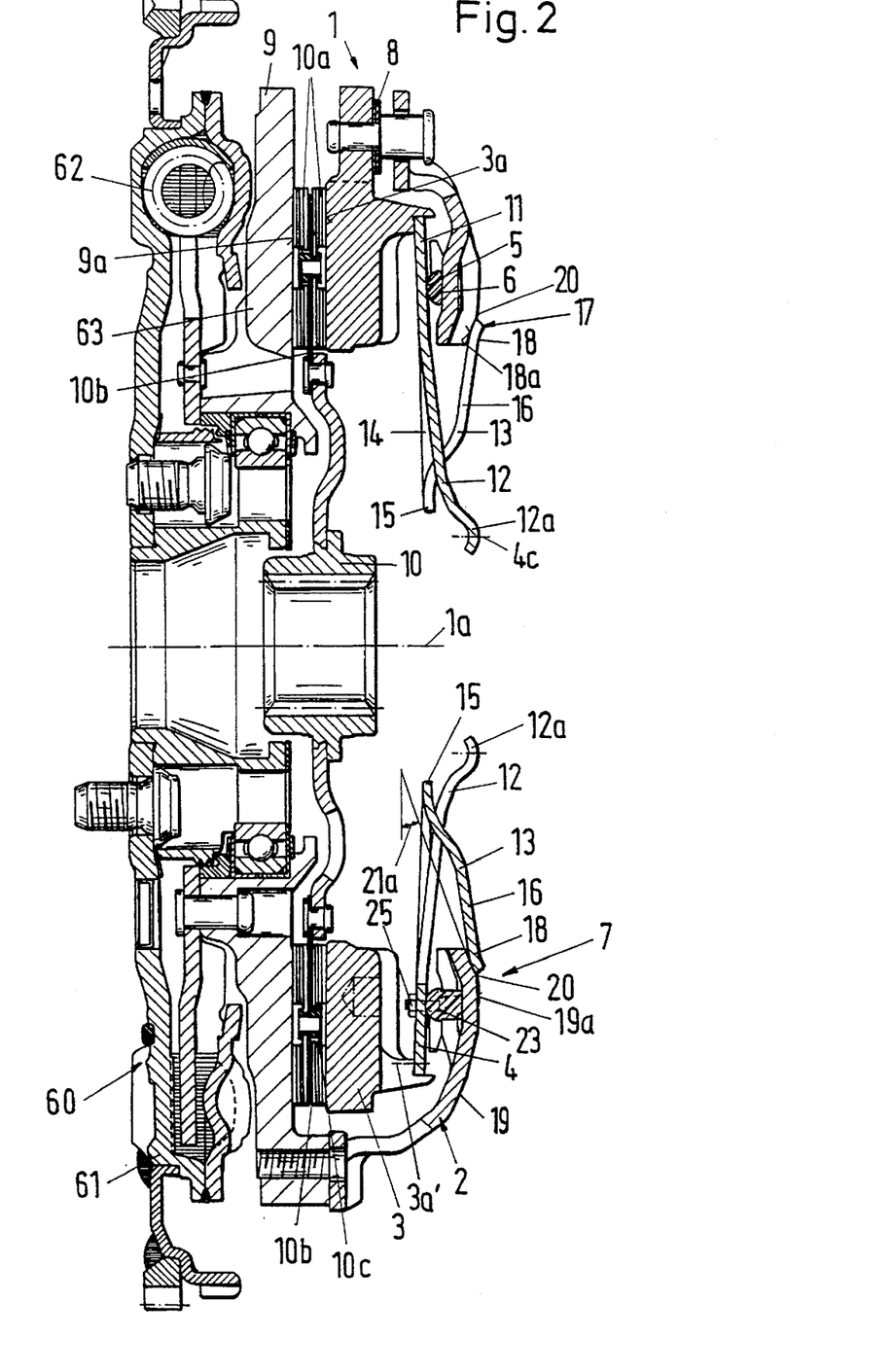
FIG. 2 is a sectional view substantially as seen in the direction of arrows from the composite line II—II in FIG. 1.

The friction clutch 1 which is shown in FIGS. 1 and 2 comprises a housing or cover 2 which is or which can be made of metallic sheet material and is rotatable about an axis 1a. The housing 2 is coaxial with and can transmit torque to a pressure plate 3 which is non-rotatably coupled to the housing by a set of leaf springs 8 in such a way that it can perform limited movements in the direction of the axis 1a, namely toward and away from a counterpressure plate 9. The latter can receive torque from the output element of a prime mover, e.g., from the camshaft or crankshaft of a combustion engine in a motor vehicle, and its radially outermost portion is non-rotatably connected with the adjacent radially outermost portion of the housing 2 by a set of bolts, screws or other suitable fasteners.

The clutch 1 further comprises a clutch spring 4, here shown as a diaphragm spring, which is installed between the inner side of the housing 2 and the pressure plate 3 and acts not unlike a two-armed lever which is tiltable relative to a seat assembly 5 at the inner side of the housing 2. The spring 4 comprises an annular main portion 11 which is caused to bear against the seat assembly 5 and also bears against the adjacent single annular projection or an annular set of several projections provided on the pressure plate 3 radially outwardly of the seat assembly. The annular main portion 11 of the spring 4 and the seat assembly 5 are located radially inwardly of the leaf springs 8 which extend substantially tangentially or circumferentially of the radially outermost portions of the housing 2 and the pressure plate 3. One end portion of each leaf spring is riveted or otherwise affixed to the housing 2 and the other end portion of each leaf spring is riveted or otherwise affixed to the pressure plate 3.

A rotary clutch disc or clutch plate 10 of the friction clutch 1 has two sets of friction linings 10a disposed between an annular friction face 3a of the pressure plate 3 and an annular friction face 9a of the counterpressure plate 9. When the clutch 1 is engaged, i.e., when the spring 4 is free to urge the pressure plate 3 axially toward the counterpressure plate 9, the friction faces 3a, 9a bear against the respective friction linings 10a so that the clutch disc 10 can transmit torque from the plates 3, 9 to the input element of a variable-speed transmission or another driven unit, not shown.

During assembly of the clutch 1, the diaphragm spring 4 is forced into the interior of the housing 2 so that it is stressed in response to engagement with the seat assembly 5 and more particularly as a result of tilting relative to an annular fulcrum 6 forming part of the seat assembly. The spring 4 is maintained in stressed condition in response to completed attachment of the radially outer portion of the housing 2 to the adjacent portion of the counterpressure plate 9.

The fulcrum 6 can be made of a suitable plastic material and forms part of the seat assembly 5 as well as of an automatic adjusting or compensating system or unit 7 serving to compensate for wear upon the friction linings 10a by automatically shifting the spring 4 in the direction of the axis 1a toward the counterpressure plate 9. In addition to compensating for wear upon the friction linings 10a, the unit 7 can be designed to also compensate for wear upon one or more additional parts of the clutch 1, e.g., for wear upon the spring 4, the friction face 3a, the friction face 9a and/or a resilient device 13 which is carried by the spring 4.

In addition to the main portion 11, the spring 4 comprises a plurality of elongated flexible tongues or prongs 12 which extend from the radially inner marginal portion of the main portion 11 toward but short of the axis 1a. The free end portions or tips 12a of the prongs 12 form part of the means for actuating the friction clutch 1; thus, the clutch is disengaged if the end portions 12a are moved (e.g., by a suitable bearing or the like) in the direction of the axis 1a toward the counterpressure plate 9 because this results in a tilting of the main portion 11 relative to the fulcrum 6 so that the radially outer part of the main portion 11 moves axially and away from the counterpressure plate 9. This enables the leaf springs 8 to move the pressure plate 3 axially and away from the counterpressure plate 9 so that the friction faces 3a, 9a no longer transmit torque to the adjacent friction linings 10a of the clutch disc 10.

As mentioned hereinbefore, the resilient device 13 is carried by the spring 4. In the embodiment of FIGS. 1 and 2, the device 13 is of one piece with the radially inner marginal portion of the annular main portion 11 of the spring 4. The device 13 reacts against the housing 2 and urges the main portion 11 of the spring 4 against the fulcrum 6 of the seat assembly 5. Actually, the device 13 is installed to pull the main portion 11 against the fulcrum 6.

The resilient device 13 includes a set of elongated portions or sections which resemble loops or hairpins and extend toward the axis 1a from the radially inner marginal portion of the major portion 11 of the spring 4. Each such portion or section (hereinafter called section) of the resilient device 13 comprises an at least substantially radially inwardly extending first portion 14 which is of one piece with the main portion 11, an at least substantially radially outwardly extending second portion 16, and a third or intermediate portion 15 which extends between and is of one piece with the radially innermost parts or portions of the portions 14 and 16 (see also FIG. 4). The radially outer part or tip 18 of each second portion 16 is enlarged (widened) in the circumferential direction of the main portion 11 (this can be readily seen in FIG. 4) and is separated from the radially inner marginal portion of the main portion 11 by a narrow slit 31 when the respective section of the resilient device 13 is in unstressed condition.

When the spring 4 is properly installed between the seat assembly 5 and the pressure plate 3, the tips 18 of the second portions 16 bear against abutments 17 at that side (19) of the housing 2 which faces away from the spring 4 and plates 3, 9. An advantage of elongated sections of the resilient device 13 is that they establish relatively long radially extending bending or torsional stretches or zones between the radially inner marginal portion of the main portion 11 and the abutments 17 at the outer side 19 of the housing 2.

The configuration of the sections of the resilient device 13 and the distance between the abutments 17 and the seat assembly 5 are related to each other in such a way that the resilient sections of the device 13 are maintained in stressed condition. As can be seen in FIG. 2, the tips 18 are or can be provided with at least slightly convex surfaces 18a which bear against the adjacent abutments 17 at the outer side 19 of the housing 2 radially inwardly of the fulcrum 6.

The abutments 17 are provided on ramps 20 which, in the friction clutch 1 of FIGS. 1 and 2, are of one piece with the housing 2. The ramps 20 have exposed sides or surfaces 19a (see FIG. 3) which are inclined with reference to a plane extending at right angles to the axis 1a. The character 21 denotes in FIG. 3 the angle which the surface 19a of each ramp 20 encloses with the aforementioned plane. The angle 21 can be between about 6° and about 12°; in FIG. 3 the angle 21 is approximately 8.5°.

The angle 21 denotes the inclination of the surfaces 19a relative to the aforementioned plane in the circumferential direction of the main portion 11 of the spring 4. However, and as can be seen in FIG. 2, the surfaces 19a of the ramps 20 are also inclined relative to such plane as seen in the radial direction of the housing 2. For example, and referring to the lower ramp 20 of FIG. 2, the surface 19a of this ramp slopes upwardly toward the axis 1a in a direction from the right to the left. Such inclination of the surfaces 19a of the ramps is indicated in FIG. 3a by an arrow 21a.

The inclination (as indicated by the arrow 21a) of the surface 19a of each ramp 20 is preferably selected in such a way that the ramps 20 extend toward the pressure plate 3 as seen in the direction of the axis 1a. Otherwise stated, and as indicated at 21 and 21a, the inclination of each surface 19a relative to a plane extending at right angles to the axis 1a varies in a plurality of directions including circumferentially of the main portion 11 (as shown at 21) and radially of the housing 2 (as indicated by the arrow 21a).

When the friction clutch 1 is new (i.e., when the wear upon the friction linings 10a is negligible or nil), the convex surfaces 18a of the tips 18 of portions 16 of the sections of resilient device 13 bear against those parts (shown at 22 in FIG. 3) of the abutments 17 which are remotest from the counterpressure plate 9, i.e., against those portions of the exposed side 19 of the housing 2 which are located at a maximum distance to the right of the fulcrum 6 as seen in FIG. 2 in the direction of the axis 1a.

The compensating unit 7 comprises a ring-shaped adjusting or compensating member 23 which includes or which forms part of the fulcrum 6. As can be seen in FIG. 3b, the member 23 (which can be made of a suitable plastic material) is provided with a set of ramps 24 which extend in the circumferential direction of the main portion 11 of the spring 4 and slope in the direction of the axis 1a. It is presently preferred to make the adjusting or moving member 23 of a suitable heat-resistant thermoplastic material. Bolts and nuts 25 or other suitable fasteners are provided to non-rotatably connect the member 23 with the clutch spring 4. However, it is equally possible to resort to simpler or more complex connections between the adjusting member 23 and the spring 4. For example, it is equally possible to resort to a plug and socket connection which is constructed in such a way that one or more male detents can be received in complementary female detents by snap action or the like. The female detents can be provided on the adjusting member 23 and/or on the spring 4, and the same holds true for the male detents. The arrangement can be such that the male detents snap into the aligned female detents in response to axial movement of the spring 4 toward the member 23 and/or in response to axial movement of the member 23 toward the spring 4.

The ramps 24 of the adjusting member 23 abut against and are slidable along complementary ramps 27 (see FIG. 3b) which are provided directly on the housing 2. However, it is equally possible to provide the ramps 27 on a separate part which is welded or otherwise affixed to the housing 2. The making of the ramps 27 directly on the housing 2 renders it possible to reduce the overall number of parts of the friction clutch 1 as well as to simplify the assembly of the clutch, particularly the assembly of the housing 2 with the spring 4 and its resilient device 13 as well as with the compensating unit 7 and seat assembly 5.

The angle of slope (shown in FIG. 3b, as at 26) of the abutting surfaces on the ramps 24 and 27 can be in the range of between about 6° and 12°, for example, about 8.5° (i.e., the same as the angles 21). Each angle 26 is preferably selected in such a way that, when the ramps 24 of the adjusting member 23 are caused to bear against the adjacent ramps 27 of the housing 2, the friction between such abutting ramps suffices to prevent rotation of the member 23 relative to the housing. For example, the abutting surfaces of the ramps 24 and 27 can be roughened or otherwise treated to enhance friction by resorting to an abrasive blasting or an analogous technique.

Figures 4, 4A, 5:
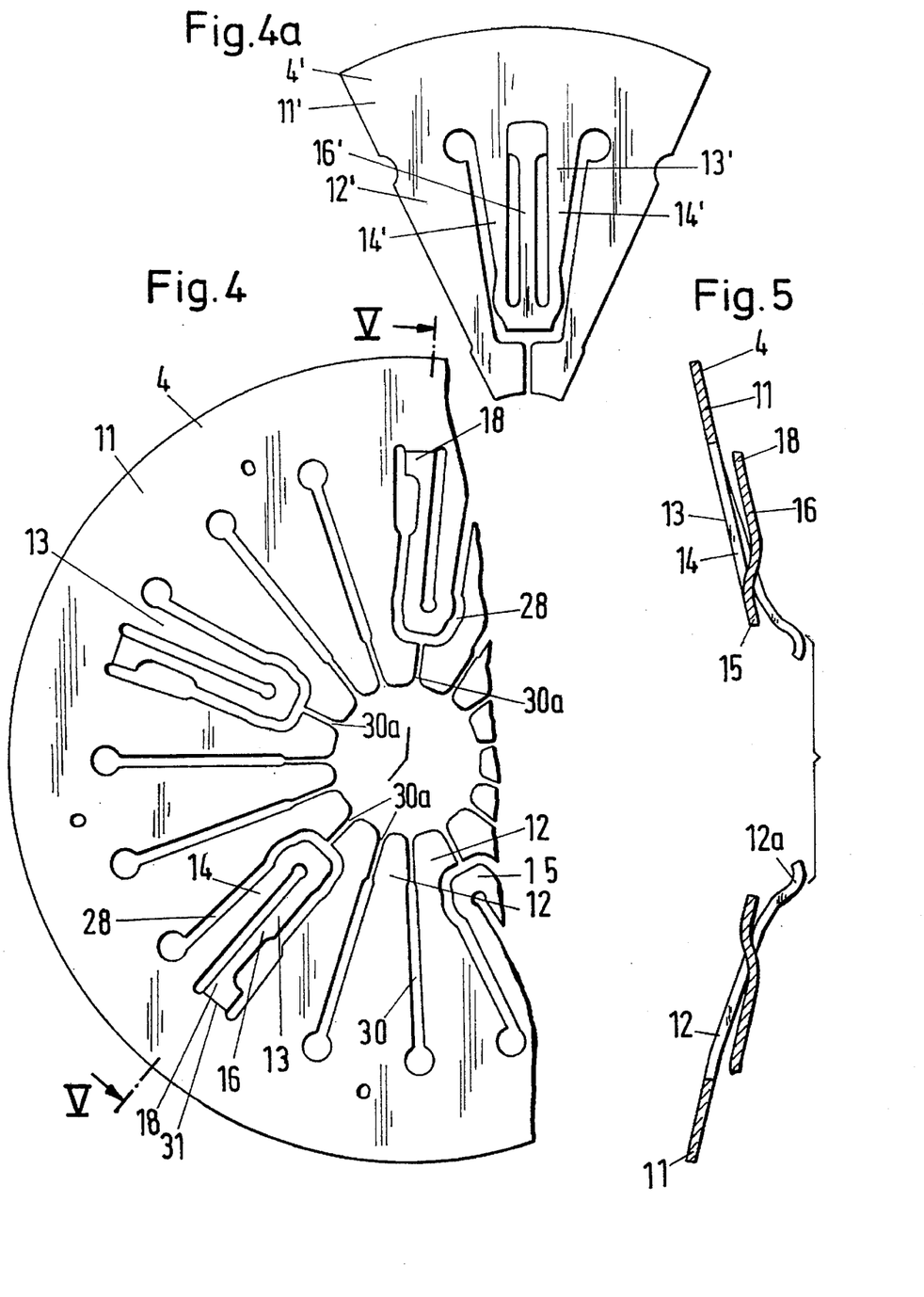
FIG. 4 is a fragmentary plan view of the clutch spring which is utilized in the friction clutch of FIGS. 1 to 3b.
FIG. 4a is a fragmentary plan view of a modified clutch spring.
FIG. 5 is a sectional view substantially as seen in the direction of arrows from the line V—V in FIG. 4.

As can be seen in FIGS. 1 and 4, the sections of the resilient device 13 alternate with sets or groups of three prongs 12, as seen in the circumferential direction of the main portion 11 of the clutch spring 4. It is possible to increase or to reduce the number of prongs 12 in each group, e.g., to four or more or to a mere two, without departing from the spirit of the invention. It is also possible to have individual prongs 12 alternate with sections 14–16 or other suitably configured and/or dimensioned sections of the resilient device 13. The sections of the resilient device 13 can be obtained by suitably trimming (e.g., in a stamping or other machine) the sheet metal blanks which are being converted into diaphragm springs 4. Such trimming necessitates, or is facilitated by, the provision of slots or cutouts 28 each of which is substantially U-shaped and surrounds the respective section of the resilient device 13. Such slots separate the portions 14–16 of the sections from the neighboring prongs 12 of the spring 4. Additional slots or cutouts 30 are provided between neighboring prongs 12 of each group of such prongs and the narrowed radially inner portions 30a of the slots 30 communicate with the central opening of the spring 4. Each substantially circumferentially extending slit 31 of the spring 4 communicates with one of the slots 29. Certain radially inner portions 30a communicate with the radially inner portions or webs of the U-shaped cutouts 28.

The relatively wide radially outermost parts 18 of the portions 16 need not be wider or much wider than the major part of each portion 16. As can be seen in each of FIGS. 1 and 4, the relatively wide parts 18 are obtained by removing more material from an intermediate part of each portion 16 slightly radially inwardly of the respective slit 31.

FIGS. 2 and 5 show that at least the part 18 of the portion 16 of each section of the resilient device 13 is offset relative to the main portion 11 of the spring 4 as seen in the direction of the axis 1a. This holds true when the spring 4 is stressed (FIG. 2) as well as in unstressed condition of such spring (see FIG. 5). The parts 18 are offset relative to the main portion 11 of the spring 4 in a direction away from the pressure plate 3, i.e., toward the exposed or outer side 19 of the housing 2.

In order to assemble the friction clutch 1, and more specifically to assemble the spring 4 with the housing 2, the adjusting member 23 is inserted into the housing 2 ahead of the main portion 11 of the spring 4. Such insertion takes place in the direction of the axis 1a of the housing 2. In the next step, the sections of the resilient device 13 (which is of one piece with the main portion 11) are deformed in the direction of the axis 1a so that the parts 18 are located outwardly of the respective ramps 20, and more specifically at the exposed side 19 of the housing and adjacent the edges 32 (FIG. 3) of the respective ramps, namely adjacent the front edges of such ramps. In the next-following step, the spring 4 and, if necessary, the adjusting ring 23, is rotated relative to the housing 2 so that the parts 18 migrate from the positions shown in FIG. 3 to those shown in FIG. 3a. In other words, the parts 18 slide along the surfaces 19a of the respective ramps 20 and thus move in the axial direction of the housing 2.

Rotation of the adjusting ring 23 relative to the housing 2 entails a sliding movement of the ramps 24 relative to the adjacent ramps 27 which causes the ring 23 to assume a retracted position relative to the housing 2. Such retracted (axial) position of the adjusting ring 23 is indicative of the fact that the friction clutch 1 is yet to undergo any wear or any appreciable wear, namely a wear which warrants compensation by moving the spring 4 in the direction of the axis 1a and away from the housing 2, i.e., toward the counterpressure plate 9. FIG. 3b shows the ramps 24 and 27 in the positions they assume when the wear upon the friction linings 10a of the clutch disc 10 is negligible or nil.

The connection between the spring 4 and the housing 2 can be said to constitute or to resemble a bayonet mount, i.e., a connection which can be established by first moving at least one of the parts substantially axially of the other part and by thereupon turning at least one of the parts relative to the other part (so that the parts 18 of the sections of the resilient device 13 move behind and engage the adjacent ramps 20 at the exposed side 19 of the housing 2). When the assembly of the spring 4 with the housing 2 is completed, the part 16 of each section of the resilient device 13 is subjected to torsional stresses and at least the part 18 of each portion 16 can be caused to pass through slots 2a provided in the radially innermost portion of the housing. Those portions of the housing 2 which are adjacent the slots 2a are offset relative to each other in the direction of the axis 1a to establish paths for for the passage of parts 18 from the inner side to the outer side 19 of the housing. In other words, when the parts 18 are caused to move in the circumferential direction of the main portion 11 (but of course with such portion), they are free to pass through the neighboring slots 2a from the interior toward and along the outer side 19 of the housing.

Figure 3:
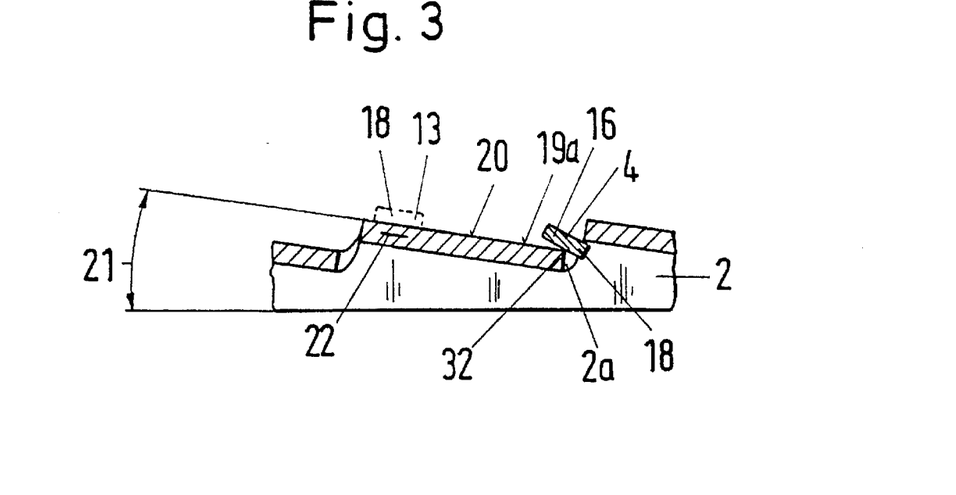
FIG. 3 is a fragmentary sectional view substantially as seen in the direction of arrows from the line III—III in FIG. 1.
Figure 3A:
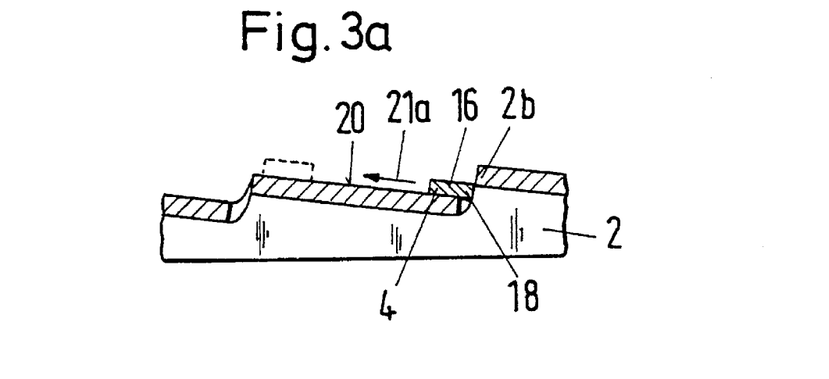
FIG. 3a is a sectional view corresponding to that of FIG. 3 but showing certain parts in different positions relative to each other.
Figure 3B:
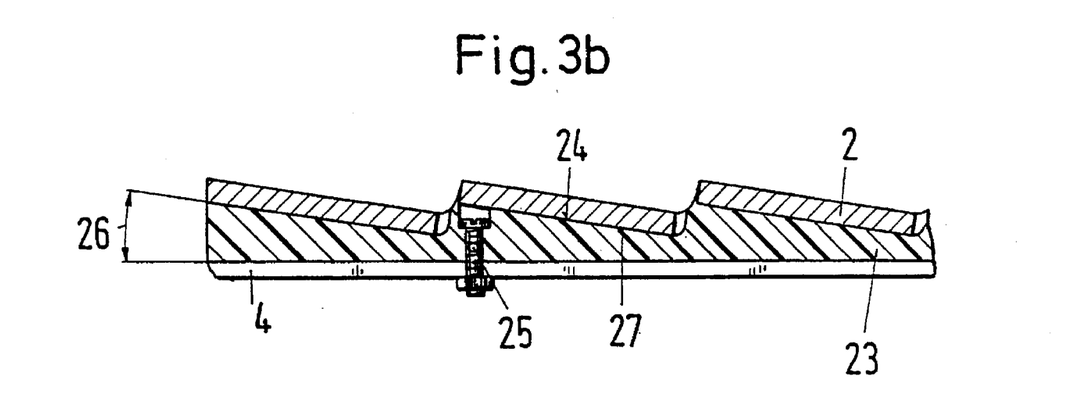
FIG. 3b is a fragmentary sectional view substantially as seen in the direction of arrows from the line IIIb—IIIb in FIG. 1.

FIGS. 3 and 3a show that the width of the parts 18 exceeds the width of the slots 2a (as seen in the circumferential direction of the main portion 11). This compels each part 18 to "ride" across the respective slot 2a, namely to move from the interior of the housing and toward and along the exposed external surface 19a (i.e., portion of the side 19) so that the portions 16 are subjected to torsional stresses as well as to stresses acting in the direction of the axis 1a.

FIG. 3a shows that the housing 2 is provided with abutments or stops 2b each of which is adjacent one of the slots 2a and is positioned in such a way that it prevents undesired separation of the portions 16 and their parts 18 from the housing. The stops 2b further serve to limit the extent of compensation for wear at least upon the friction linings 10a of the clutch disc 10. Such limiting of the extent of compensation is desirable and advantageous in order to prevent the friction faces 3a, 9a of the plates 3 and 9 from actually contacting the heads of rivets 10c which are used to secure the two sets of friction linings 10a to each other. This protects the friction faces 3a, 9a in that such friction faces can be caused to move to but not beyond those positions relative to each other (as seen in the direction of the axis 1a) in which the distance between the friction faces 3a, 9a at least equals but preferably at least slightly exceeds the axial length of a rivet 10c.

As already mentioned above, the parts 18 of the portions 16 are moved in the direction of the arrow 21a shown in FIG. 3a in order to advance the parts 18 to proper positions (as shown in FIG. 3a by broken lines) indicative of the absence of wear (or any appreciable wear) upon the friction linings 10a.

When the spring 4 is properly assembled with the housing 2, the bias of the sections 14–16 of the resilient device 13 upon the main portion 11 (in a direction to urge the main portion 11 against the fulcrum 6 forming part of the seat assembly 5 and compensating unit 7, i.e., of the adjusting member 23) exceeds the magnitude of the disengaging force acting upon the tips 12a of the prongs 12 in a direction to permit the leaf springs 8 to move the pressure plate 3 axially and away from the counterpressure plate 9, i.e., to release the friction linings 10a of the clutch disc 10. This holds true as long as the wear upon the friction linings 10a is still zero or close to zero as well as immediately upon each axial shifting of the adjusting member 23 to compensate for wear upon the friction linings 10a. At the very least, the force or bias of the resilient means 13 acting upon the main portion to urge the latter against the fulcrum 6 at least matches the force which must be applied to the tips 12a of the prongs 12 in order to disengage the friction clutch 1 prior to any wear upon the friction linings 10a or immediately upon compensation for the wear. Such balancing of the two forces ensures that the adjusting member 23 is confined between the spring 4 and the housing 2 without any axial play, i.e., it is clamped between the housing and the clutch spring to thus prevent any unnecessary or untimely compensation for (non-existent) wear. As already mentioned above, the unit 7 can compensate for wear upon the friction linings 10a; however, such unit can also compensate for wear upon two or more components of the clutch 1, for example, upon the friction linings 10a as well as upon the friction face 3a of the pressure plate 3 and/or upon the friction face 9a of the counterpressure plate 9 and/or upon the spring 4 and/or upon the fulcrum 6.

The mode of operation of the automatic wear compensating unit 7 will be described with reference to the diagrams of FIGS. 6 and 7.

Figure 6:
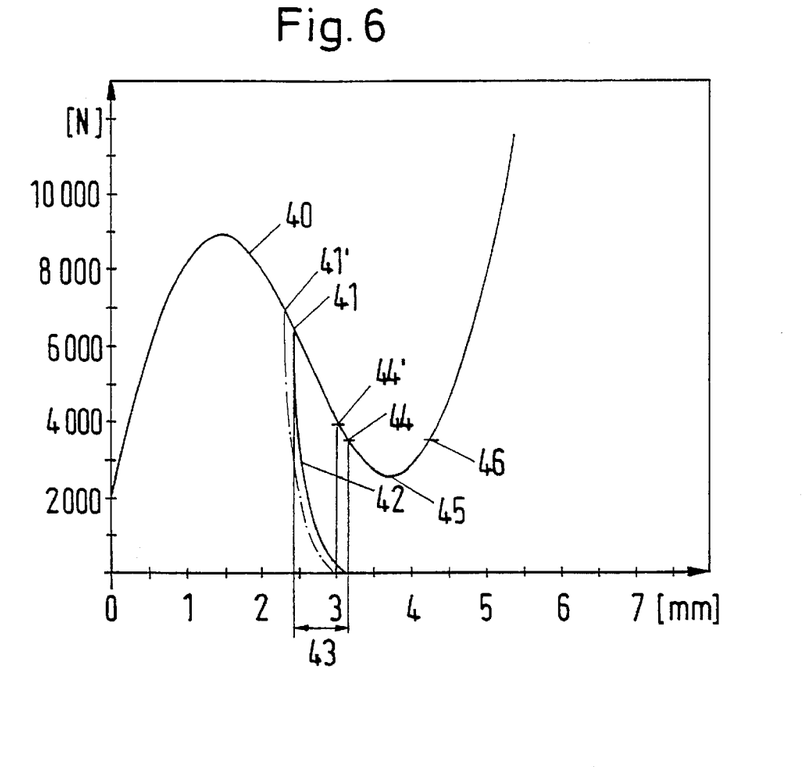
FIG. 6 is a diagram showing the characteristic curves of the clutch spring and of the resilient means forming part of the clutch disc in the friction clutch of FIGS. 1 to 3b.

The curve 40 in the diagram of FIG. 6 is indicative of the axial force which is generated in dependency upon the changes of conicity of the clutch spring 4, and more specifically as a result of deformation of the spring 4 between two supports or seats spaced apart from each other a radial distance corresponding to that between the seat assembly 5 and the annular locus (having a diameter 3a') of contact between the main portion 11 of the spring 4 and the pressure plate 3. The locus of contact of the main portion 11 with the pressure plate 3 (at the diameter 3a') is disposed radially outwardly of the seat assembly 5. The axial force which is denoted by the curve 40 is influenced by the axial force which is generated by the leaf springs 8 and which varies in response to axial movement of the pressure plate 3 toward and away from the counterpressure plate 9. The leaf springs 8 act upon the clutch spring 4 through the medium of the pressure plate 3.

The point 41 on the curve 40 is indicative of that axial force which is generated by the clutch spring 4 (and is influenced by the force of the leaf springs 8) upon completed installation of the spring 4 in the housing 2 and in the engaged condition of the friction clutch 1. In other words, the point 41 is indicative of the maximum force which the spring 4 applies to the pressure plate 3 in the absence of wear upon the friction linings 10a and in the engaged condition of the clutch 1. The point 41 can be shifted along the curve 40 (toward and away from the ordinate of the diagram shown in FIG. 6) by changing the conicity of the spring 4 relative to a plane which is normal to the axis 1a.

The curve 42 in the diagram of FIG. 6 is indicative of that axial force which is generated by the resilient segments 10b which form part of the clutch disc 10 and are installed between the two sets of friction linings 10a. When the clutch 1 is engaged, the plates 3 and 9 maintain the resilient segments 10b in stressed condition, namely, the segments 10b tend to move the two sets of friction linings 10a axially and away from each other. The axial force which is generated by the segments 10b opposes the axial force of the spring 4. During disengagement of the friction clutch 1, i.e., when the tips 12a of the prongs 12 forming part of the spring 4 are caused to move in a direction to the left, as viewed in FIG. 2, the resilient segments 10b are free to dissipate energy and move the two sets of friction linings 10a axially and away from each other, i.e., the segments 10b assist the disengagement of the clutch. The extent of axial expansion of the resilient segments 10b (i.e., the extent of axial movements of the two sets of friction linings 10a away from each other) during disengagement of the cutch 1 is shown in FIG. 6, as at 43. In other words, the resilient segments 10b (which store a maximum amount of energy when the clutch 1 is fully engaged) assist the leaf springs 8 in pushing the pressure plate 3 axially and away from the counterpressure plate 9 through the distance 43. This, in turn, indicates that the utilization of the resilient segments 10b renders it possible to reduce the maximum disengaging force which is required to move the friction faces 3a and 9a axially and away from the resilient segments 10b.

The point 44 on the curve 40 in the diagram of FIG. 6 denotes those axial positions of the plates 3 and 9 relative to each other when the friction faces 3a, 9a no longer contact the respective friction linings 10a, i.e., when the transmission of torque between the plates 3, 9 and the clutch disc 10 is terminated. Due to the degressive nature of that portion of the characteristic curve 40 of the spring 4 which is located to the right of the point 44, it is necessary to exert a relatively small force in order to move the plate 3 axially and further away from the counterpressure plate 9, i.e., to move the friction face 3a further away from the exposed side of the adjacent friction lining 10a. FIG. 6 shows that the force denoted by that portion of the curve 40 which is located to the right of the point 44 is much smaller than the force denoted by the point 41. If the clutch 1 is not provided with any means for opposing a further reduction of the axial force exerted by the spring 4 during movement of the pressure plate 3 further away from the counterpressure plate 9 (i.e., beyond and to the right of point 44 on the curve 40), the magnitude of the disengaging force decreases all the way to the point 45 which is the lowermost point of the substantially sinusoidal curve 40.

The required disengaging force begins to increase beyond the point 45 on the curve 40. However, the distance through which the tips 12a of the prongs 12 are caused to move axially toward the counterpressure plate 9 during disengagement of the clutch 1 is or can be selected in such a way that the actual disengagement of the clutch does not progress beyond the point 45 and is preferably terminated ahead of such point, e.g., somewhere between the points 44 and 45 on the curve 40 of FIG. 6. It is presently preferred to ensure that the disengagement of the clutch does not progress beyond the point 46 on the curve 40. Otherwise, it is either necessary or advisable to equip the friction clutch 1 with suitable compensating means to counteract that undesirable disengaging force which is generated by the spring 4 subsequent to movement of the friction face 3a of the pressure plate 3 axially and away from contact with the adjacent set of friction linings 10a.

Figure 7:
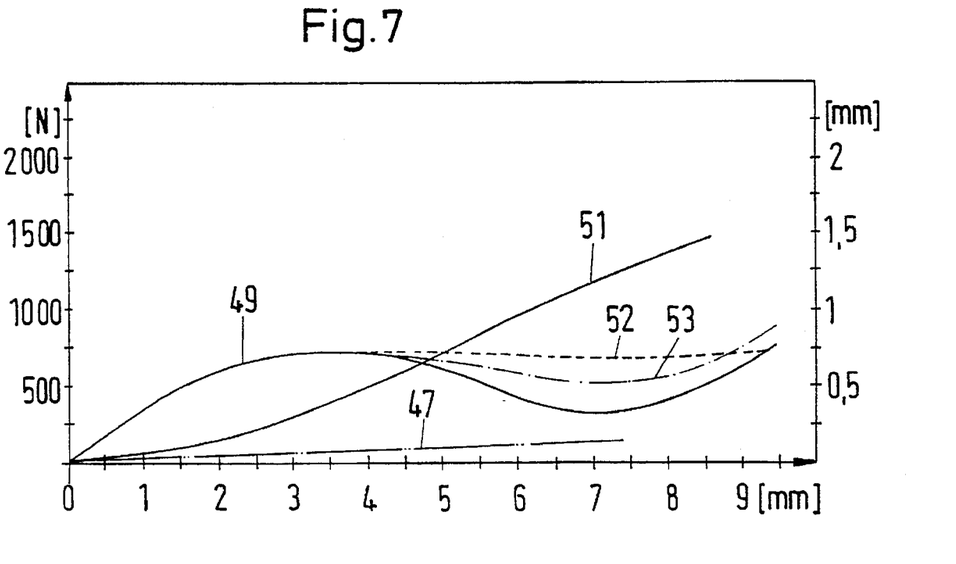
FIG. 7 is a diagram showing the characteristic curve of the resilient means carried by the clutch spring.

The distance-to-force characteristic curve of the resilient device 13 is shown at 47 in the diagram of FIG. 7. The progress of force denoted by the curve 47 is substantially linear; however, it is also possible to construct the resilient device 13 in such a way that the curve 47 will exhibit an at least slightly progressive or degressive character.

The supporting or opposing force jointly generated by the sections of the resilient device 13 is smaller than the force generated by the spring 4 at the point 44 of the curve 40, namely by a value corresponding to the lever transmission or mechanical advantage of the spring 4. In many or most instances, such mechanical advantage is in the range of between 1 to 3 and 1 to 5; however, it is also possible to select an advantage which is outside of (namely above or below) such range.

The aforementioned mechanical advantage is determined by the ratio of the radial distance between the seat assembly 5 and the aforementioned diameter 3a' denoting the annular or substantially annular locus of contact between the main portion 11 of the clutch spring 4 and the pressure plate 3 to the radial distance between seat assembly 5 and the diameter 4c of the circle defined by the tips 12a of the prongs 12 forming part of the spring 4 and extending radially inwardly from the radially inner marginal portion of the main portion 11.

The clutch disc 10 can be equipped with any one of a wide variety of resilient segments 10b. Certain presently preferred resilient elements which can be used between the two sets of friction linings 10a in the clutch 1 of FIGS. 1 and 2 are disclosed, for example, in published German patent application No. 42 06 880.

An optimal operation of the friction clutch 1, and more specifically an automatic compensation by the unit 7 for the wear upon the friction linings 10a can be ensured, or at least promoted, if the progress of the clutch disengaging force at least resembles that which is denoted by the curve 49 shown in the diagram of FIG. 7. Thus, the sum of forces furnished by the resilient segments 10b and the resilient device 13 and acting upon the spring 4 should exceed or at least match the disengaging force acting upon the tips 12a of prongs 12 forming part of the diaphragm spring 4. Furthermore, when the segments 10b have already dissipated their energy in response to movement of the pressure plate 3 away from the counterpressure plate 9 so that the bias of the spring 4 is opposed only by the resilient device 13, the force generated by the device 13 should also exceed or at least match the aforementioned disengaging force acting upon the tips 12a of the prongs 12. The curve 49 indicates that the magnitude of the clutch disengaging force varies sinusoidally during actual disengagement of the friction clutch 1.

The preceding description of the mode of operation of the friction clutch 1 is based on the assumption that the diaphragm spring 4 is installed in a predetermined position and prior to any (or any appreciable) wear upon the friction linings 10a. When at least some parts of the clutch 1 (particularly the friction linings 10a) have undergone a certain amount of wear so that the spring 4 is free to move the pressure plate 3 closer to the counterpressure plate 9 in the engaged condition of the clutch, this entails a change of the conicity of the spring 4 and hence also a change of the axial force which the spring 4 applies to the pressure plate 3 in the engaged condition of the clutch. In the absence of any undertaking to the contrary, the bias of the spring 4 upon the pressure plate 3 would increase or, stated otherwise, the point 41 on the curve 40 in the diagram of FIG. 6 would migrate toward the position 41' and, therefore, the point 44 would migrate toward the location 44'. This would destroy the relationship or equilibrium of forces during disengagement of the clutch 1 such as existed prior to the development of wear at least upon the friction linings 10a at or close to the point 44 on the curve 40 of FIG. 6. More specifically, the development of wear at least upon the friction linings 10a (and the resulting change in the position of the spring 4) would destroy the balance between the disengaging forces acting upon the tips 12a of the prongs 12 in a direction to disengage the clutch 1 and the bias of the resilient device 13 which opposes such disengaging forces.

The rise of axial force which the spring 4 would exert upon the pressure plate 3 in response to progressing wear upon the friction linings 10a would cause a change in the progress (such as a shifting) of the characteristic curve 49 denoting the clutch disengaging force during depression of the tips 12a of prongs 12 in a direction toward the counterpressure plate 9. The disengaging force would rise. As the magnitude of the disengaging force increases in response to wear upon the friction linings 10a, the bias of the resilient device 13 upon the spring 4 is overcome during disengagement of the friction clutch 1. Thus, the resilient device 13 (whose sections act not unlike sensors or detectors) exerts a force which opposes the disengagement of the clutch 1 but is overcome, i.e., the resilient device undergoes an elastic deformation. Such elastic deformation of the resilient device 13 (which reacts against the housing 2 and bears upon the clutch spring 4) entails, in turn, an axial displacement of the seat assembly 5 in the direction of the axis 1a and toward the counterpressure plate 9. The extent of axial displacement of the spring 4 toward the counterpressure plate is commensurate with the extent of wear at least upon the friction linings 10a. This relieves the axial pressure upon the adjusting member 23 so that the frictional engagement between the ramps 24 of the adjusting member 23 and the ramps 27 of the housing 2 is is greatly reduced, e.g., all the way to zero.

During the aforediscussed elastic deformation of the resilient device 13, the main portion 11 of the clutch spring 4 bears upon the pressure plate 3 at the locus 3a' so that the friction face 3a of the pressure plate 3 is biased against the adjacent set of friction linings 10a. The spring 4 changes its conicity as well as the stored amount of energy and hence also the magnitude of the transmittable torque. Otherwise stated, there develops a change of the magnitude of force which the clutch spring 4 applies to the resilient device 13 and to the pressure plate 3. Such change of the magnitude of force takes place in a manner as shown in the diagram of FIG. 6, namely in a sense to reduce the magnitude of the force being applied by the spring 4. Such change continues to take place until the magnitude of the axial force exerted by the spring 4 upon the resilent device 13 is again in a state of equilibrium with the magnitude of opposing force furnished by the resilient device 13. With reference to the diagram of FIG. 6, this indicates that the point 41' of the curve 40 migrates in a direction toward the point 41 and the point 44' migrates toward the point 44.

Once the equilibrium is reestablished, the pressure plate 3 can become disengaged from the adjacent set of friction linings 10a because, as the disengagement progresses, the spring 4 is tilted at least substantially at the radial level of the seat assembly 5. It is important for proper operation of the wear compensating unit 7 to ensure that the spring rate or spring gradient of the resilient device 13 (i.e., the increase of force per unit of distance) is less than the increase of the disengaging force per unit distance which is being applied to the tips 12a of the prongs 12 at the diameter 4c and is caused due to wear upon the friction linings 10a at least close to the region between the points 44 and 44' of the curve 40 shown in FIG. 6. In other words, it is important to ensure that, in the event of wear upon the friction linings 10a, at least a small portion of the actuating movement or tilting of the spring 4 entails a relaxation of bias upon the adjusting member 23 preferably at least through a small or very small distance which can be in the range of a few hundredths of one millimeter so that the member 23 can change its axial position relative to the housing 2. It is preferred to ensure that such relaxation of the bias upon the adjusting member 23 takes place shortly prior to or actually during disengagement of the friction face 3a of the pressure plate 3 from the adjacent set of friction linings 10a, i.e., in the region of the point 44 or 44' on the curve 40 in the diagram of FIG. 6.

If the disengagement continues beyond the point 44, the resilient device 13 is again free to pull the spring 4 in the axial direction of the housing 2 so that the adjusting member 23 is again securely clamped between the housing 2 and the spring 4. This is due to the fact that, once beyond the point 44, the disengaging force which is required to tilt the spring 4 decreases at least during a portion of remaining stage of disengagement of the clutch 1 in a manner as represented by the curve 40 of FIG. 6 and the curve 49 in the diagram of FIG. 7.

Figure 8:
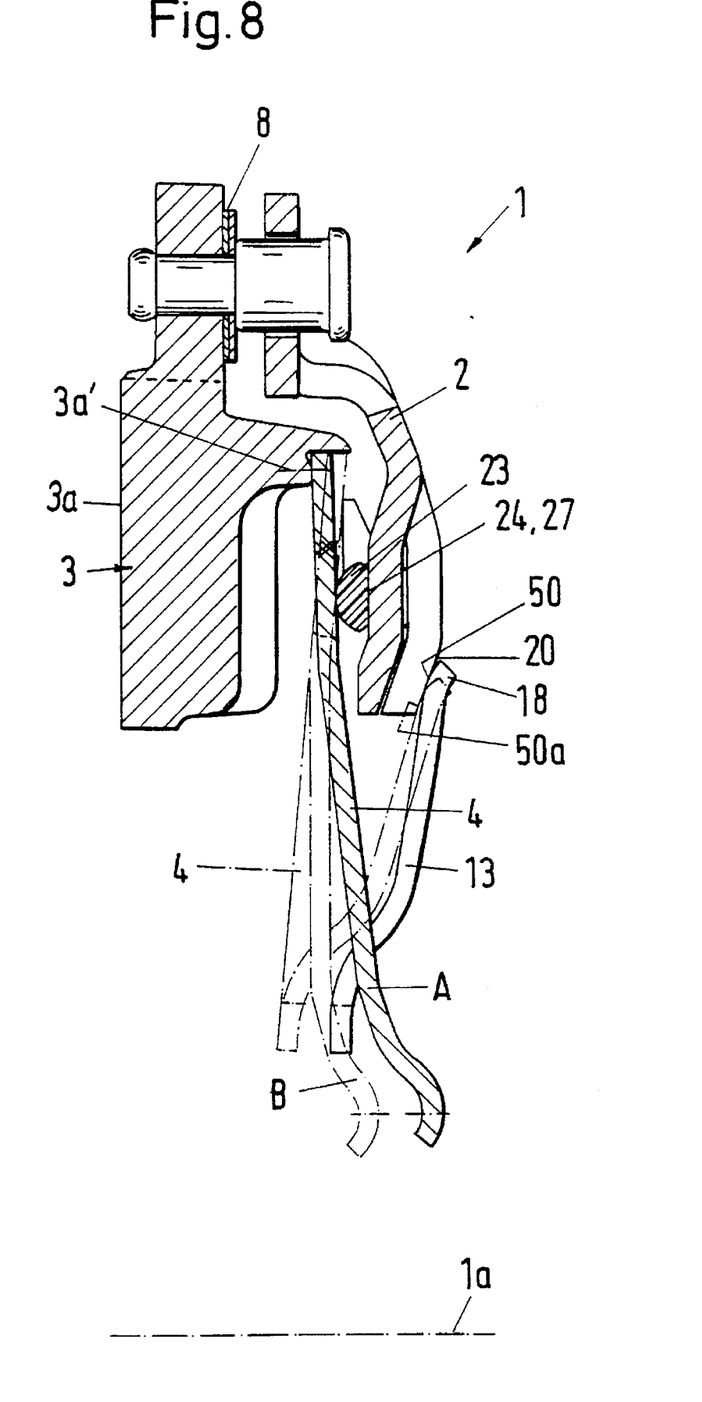
FIG. 8 is an enlarged view of a detail in the upper portion of FIG. 2.

In FIG. 8, the position of the spring 4 in the engaged condition of the friction clutch 1 is indicated by solid lines, as at A. On the other hand, the position of the spring 4 in the disengaged condition of the clutch is shown by broken lines, as at B. As can also be seen in FIG. 8, the points or regions (50) of contact between the housing 2 (and more specifically its ramps 20) and the sections of the resilient device 13 move radially along the ramps 20 during tilting of the spring 4 in a sense to effect a disengagement of the friction clutch 1. Such movement is terminated when the ramps 20 and the sections of the resilient device 13 engage each other at the points 50a, i.e., nearer to the axis 1a of the housing 2. During such stage of disengagement of the friction clutch 1, the ratio of the forces acting upon the spring 4 to the forces acting between the ramps 20 and the resilient device 13 at the points 50 and 50a as well as the friction between the ramps 24 and 27 are such that the spring 4 is brought to a halt relative to to the housing 2, as seen in the circumferential direction of the main portion 11. In other words, the spring 4 does not turn, also when the friction linings 10a have undergone a certain amount of wear. FIG. 8 shows that, during disengagement of the clutch 1, the points 50 move along the ramps 20 radially inwardly (downwardly) along downwardly sloping paths in contrast to the situation during engagement of the clutch when the points 50 move along the ramps 20 upwardly, as seen in the radial direction. Moreover, friction which exists between the resilient device 13 and the housing 2 during disengagement of the clutch 1 causes the portions 16 of the sections of the device 13 to be subjected to tensional stresses, i.e., the portions 16 can be said to be subjected to a stretching action. On the other hand, when the clutch 1 is being disengaged, the portions 16 of sections forming part of the resilient device 13 are subjected to compressive or upsetting stresses. In other words, the stressing of the resilient device 13 is not the same during engagement and disengagement of the clutch 1.

A frictional engagement exists between the adjusting member 23 and the housing 2 during disengagement of the clutch 1; such frictional engagement persists until the stress by the spring 4 upon the member 23 is reduced at least close to zero. If the friction linings 10a have undergone a certain amount of wear, the stress upon the adjusting member 23 is reduced to zero, at least during a relatively small stage of disengagement of the clutch 1, so that the previously existing frictional engagement between the adjusting member 23 and the housing 2 is temporarily (namely during the aforementioned stage of disengagement of the clutch) reduced to zero. As the disengagement of the clutch 1 progresses beyond the just mentioned stage (during which the member 23 is not compelled to frictionally engage the housing 2), the member 23 is again clamped between the spring 4 and the housing 2 in the direction of the axis 1a due to the degressive nature of the corresponding portion of the characteristic curve of the spring 4. In other words, the adjusting member 23 is again maintained in frictional engagement with the housing 2 to an extent which depends upon the then prevailing clamping force.

In view of the just described mode of operation and particularly of the nature of various frictional engagements, the forces acting upon the spring 4 in the circumferential direction are larger during engagement than during disengagement of the friction clutch 1. This holds particularly true for frictional engagement between the housing 2, spring 4 and adjusting member 23 and especially for the aforediscussed stage of disengagement of the clutch when the stress upon the member 23 is reduced to zero and the unit 7 is free to compensate for wear at least upon the friction linings 10a. Among other reasons, this is attributable to the fact that the points 50, 50a must move along the respective ramps 20 and upwardly during engagement of the clutch 1. Due to the friction which prevails between the sections of the resilient device 13 and the housing 2, and also due to the fact that the ramps 20 are inclined not only radially but also circumferentially relative to a plane which is normal to the axis 1a, the tips 18 of portions 16 of sections forming part of the resilient device 13 are acted upon by forces in the radial direction as well as in the circumferential direction of the main portion 11 of the spring 4.

During engagement of the friction clutch 1, and more specifically at least during that stage of disengagement when the adjusting member 23 is not stressed by the spring 4 (namely when the member 23 is not forced to frictionally engage the housing 2), the force acting upon the spring 4 in the circumferential direction suffices to induce an angular movement of the spring 4 relative to the housing 2 at least during the aforementioned stage of disengagement of the clutch. As the spring 4 turns relative to the housing 2, it causes the tips 18 of portions 16 forming part of the respective sections of the resilient device 13 to slide along the respective ramps 20 in the radial direction as well as in the circumferential direction. The movement of tips 18 in the circumferential direction of the main portion 11 of the spring 4 is also attributable to the fact that, while moving along the respective ramps 20, the tips 18 seek to follow the path of least resistance, namely the direction of minimal slope or rise due to the twodimensional or twodirectional inclination of the ramps 20 relative to the plane extending at right angles to the axis 1a. In view of the just outlined situation, the tips 18 tend to slide circumferentially along the respective ramps 20 and downwardly during each engagement of the clutch 1. Since the adjusting member 23 and the spring 4 cannot turn relative to each other, and since the tips 18 form part of the spring 4, the adjusting member 23 is also caused to turn relative to the housing 2 so that its ramps 24 slide along the adjacent ramps 27 of the housing 2. Such relative movement between the member 23 and the housing 2, and the resulting axial displacement of the member 23, compensates for wear upon the friction linings 10a. In other words, the extent of axial displacement of the member 23 as a result of sliding movement of its ramps 24 along the adjacent ramps 27 of the housing 2 is indicative of the extent of wear upon the friction linings 10a and, if desired or necessary, upon the part 3, 9 and/or 4 of the clutch. The combined angular and axial adjustment of the member 23 relative to the housing 2 proceeds at least until the member 23 is again clamped between the spring 4 and the housing 2, and more specifically between the spring 4 and the ramps 27 of the housing. The friction between the ramps 27 of the housing 2 and the adjacent ramps 24 of the adjusting member 23 then suffices to prevent further angular displacement of the member 23 relative to the housing 2, i.e., to prevent any further compensation for wear at least upon the friction linings 10a.

However, it is also possible to design and assemble the clutch 1 in such a way that the compensation for wear upon the friction linings 10a proceeds slightly beyond the aforementioned stage when the extent of frictional engagement between the ramps 24 and 27 is insufficient to prevent the spring 4 and hence the resilient device 13 from turning relative to the housing 2. Thus, the arrangement can be such that, during engagement of the clutch 1, the adjusting member 23 (which is not clamped in the direction of the axis 1a) can be caused to turn with the spring 4 relative to the housing 2 with the result that static friction between the ramps 24 and the adjacent ramps 27 is converted into sliding friction which is less than the static or clinging friction between the aforementioned ramps.

When the wear compensating operation is completed, the progress of the clutch disengaging force again corresponds to that denoted by the curve 49 in the diagram of FIG. 7 and at least the friction face 3a of the pressure plate 3 moves away from contact with the adjacent set of friction linings 10a at a time as denoted by the point 44 on the characteristic curve 40 in the diagram of FIG. 6. The curve 51 in the diagram of FIG. 7 denotes the axial movement of the pressure plate 3 when the progress of the clutch disengaging force corresponds to that denoted by the curve 49.

In actual use of the friction clutch 1, the compensating unit 7 is caused to carry out minute adjustments in the axial position of the spring 4 practically continuously and each such adjustment is or can be extremely small. In other words, the rather pronounced changes in the axial positions of the spring 4 and the correspondingly large shifts of various points along the curves in the diagrams of FIGS. 6 and 7 are exaggerated for the sake of clarity.

The sinusoidal curve 49 of FIG. 7 shows that, when the friction clutch 1 is to be disengaged, the magnitude of the disengaging force acting upon the tips 12a of the prongs 12 forming part of the spring 4 initially increases to a maximum value, that such disengaging force thereupon gradually decreases and thereupon gradually increases toward a maximum value (e.g., when the tips 12a have completed an axial movement through a distance of approximately 9 mm). Such progress of the disengaging force (curve 49) is satisfactory in many but not all instances. Thus, it is often desired or it can be desirable to avoid pronounced (or even less pronounced) changes of the disengaging force, e.g., a pronounced change of the disengaging force (as denoted by the curve 49 of FIG. 7) when the friction face 3a of the pressure plate 3 loses contact with the adjacent set of friction linings 10a. At least pronounced fluctuations of the magnitude of the clutch disengaging force can be eliminated or greatly reduced by appropriately shaping the ramps 20 at the outer side 19 of the housing 2 in a direction radially of the axis 1a. Such modification of the ramps 20 can entail a change of the progress of distance of the locus of contact between the spring 4 and the fulcrum 6 from locus of contact between the sections of the resilient device 13 and the cover 2, and this during disengagement of the clutch 1.

However, the configuration of the ramps 20 in the radial direction can also be such that, at least during a certain stage of disengagement of the clutch 1, the distance of locus of contact between the spring 4 and the fulcrum 6 from the location of contact between the spring 4 and the pressure plate 3 increases. This renders it possible to change the stressing of the spring 4, namely, as the just mentioned distance increases, the axial bias of the sections of the resilient device 13 forming part of the spring 4 upon the latter increases. The device 13 is subjected to an additional stress during disengagement of the clutch 1 to thus increase the magnitude of disengaging force which is to be applied to the tips 12a of the prongs 12 forming part of the spring 4. To this end, the ramps 20 can be configurated in such a way that, at least when the friction face 3a of the pressure plate 3 is about to move away from contact with the adjacent set of friction linings 10a, the disengaging force begins to exhibit a linear progress, i.e., the corresponding curve is without pronounced hills and valleys. The curve 52 denotes in FIG. 7 a maximally linearized progress of the disengaging force. The curve 53 denotes the progress of a force which can be achieved in actual practice by appropriate shaping of the ramps 20 in accordance with presently available and/or possible and/or economically achievable techniques.

FIG. 4a shows a portion of a modified diaphragm spring or clutch spring 4' wherein the sections of the resilient device 13' again alternate with the radially inwardly extending prongs 12' which are of one piece with the radially inner marginal portion of the annular main portion 11' of the spring 4'. Each section of the resilient device 13' comprises a U-shaped part having two radially inwardly extending portions 14' which have radially outermost parts of one piece with the main portion 11' and radially innermost parts merging into each other. Furthermore, each section of the resilient device 13' comprises a median portion 16' which is disposed between the respective portions 14' and extends radially inwardly from the radially outermost parts of the portions 14' toward the radially inner marginal portion of the main portion 11'. The radially innermost part of the portion 16' is adjacent to but is not of one piece with the main portion 11'. The sections of the resilient device 13' can be obtained by trimming in a stamping device or in any other suitable way.

Figure 9:
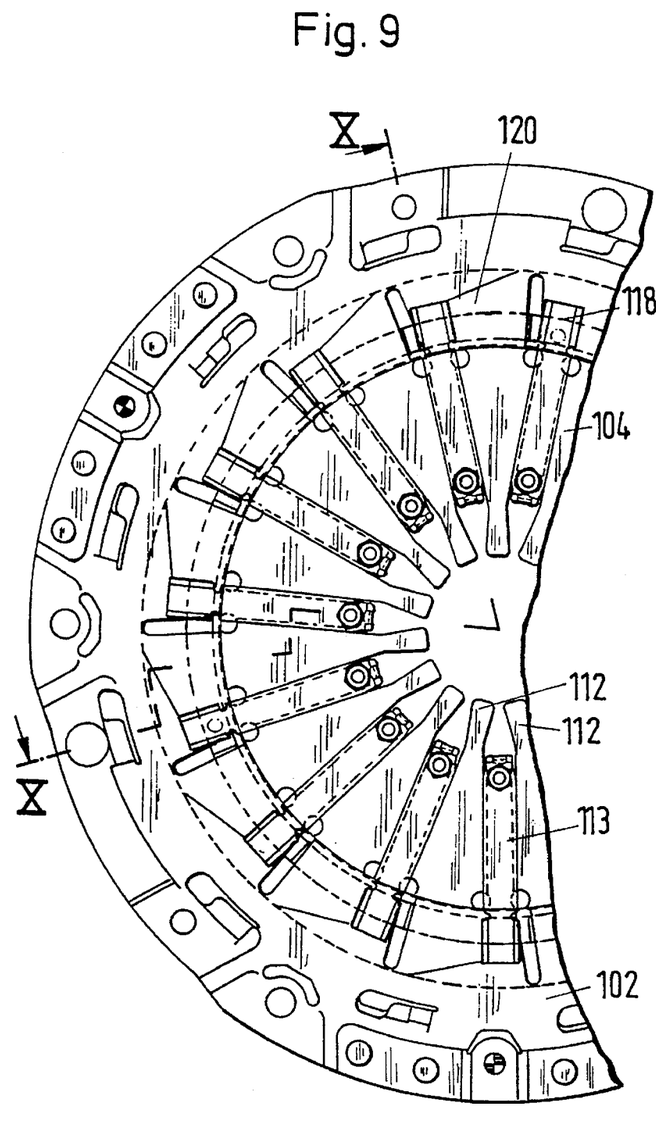
FIG. 9 is a fragmentary elevational view of a further friction clutch.
Figure 10:
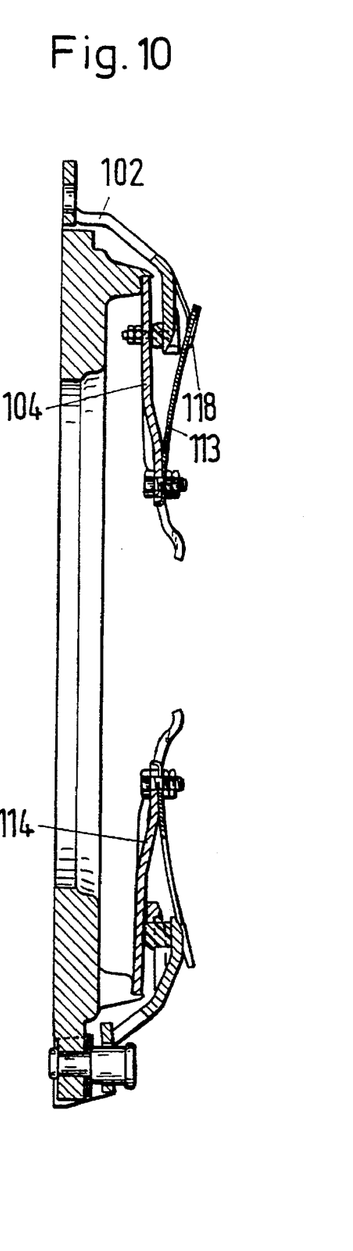
FIG. 10 is a sectional view substantially as seen in the direction of arrows from the composite line X—X in FIG. 9.

FIGS. 9 and 10 illustrate all relevant details of a further friction clutch wherein the resilient device 113 is carried by but is not of one piece with the clutch spring 104, e.g., a diaphragm spring similar to the spring 4 or 4'. The sections of the resilient device 113 are secured to the spring 104 by bolts and nuts and/or by other suitable fastener means. Each section of the resilient device 113 can be said to constitute a leaf spring having a radially outer portion which engages a ramp 120 at the outer side of the clutch housing 102 substantially in the same way as described for the tips 18 of portions 16 of the resilient device 13 and the ramps 20 of the housing 2 in the friction clutch 1 of FIGS. 1 and 2o The radially inner portions of the leaf springs constituting or forming part of sections which, in turn, form part of the resilient device 113 are affixed to the prongs or tongues 114 of the spring 104. The tongues 114 alternate with the prongs 112 of the spring 104, as seen in the circumferential direction of the annular main portion of the spring 104.

In lieu of utilizing bolts and nuts, the connections between the leaf springs of the resilient device 113 and the tongues 114 of the spring 104 can be designed in a number of other ways. For example, the radially inner portions of the leaf springs forming the sections of the resilient device 113 can be caused to extend around (e.g., to straddle) the radially inner end portions of the tongues 114 forming part of the spring 104 and alternating with the prongs 112. It is further possible to connect the discrete leaf springs or sections of the resilient device 113 to each other by a ring or washer to facilitate attachment to the spring 104. It is also possible to replace the illustrated composite resilient device 113 with a one-piece device which resembles a diaphragm spring and has radially outer portions which abut the ramps 120 of the housing 102. Such radially outer portions of the one piece resilient device (replacing the illustrated multiple-piece device 113) can constitute lugs, prongs, tongues, arms and/or other types of projections which can perform the function of the radially outer parts 118 of the leaf springs constituting the sections of the composite resilient device 113 of FIGS. 9 and 10.

Referring again to FIG. 2, the counterpressure plate 9 which is shown therein constitutes a mass or one flywheel (63) of a composite flywheel 60 which further includes a second mass or flywheel 61 coaxial with the flywheel 63. The composite flywheel 60 further includes at least one damper 62 which is installed between and opposes angular movements of the flywheels or masses 61, 63 relative to each other. The flywheel or mass 61 is a primary flywheel which can be attached to the output element of a prime mover (e.g., to the crankshaft or the camshaft of a combustion engine in a motor vehicle) by bolts, screws or in any other suitable way. The counterpressure plate 9 is a secondary flywheel (63) which receives torque from the primary flywheel 61 of the composite flywheel 60 through the medium of the damper 62. The hub of the clutch disc 10 is non-rotatably connectable to an input element, e.g., to the input shaft of a variable speed transmission in the power train between the clutch and one or more driven units (such as wheels) of a motor vehicle.

It is further possible to utilize one or more constituents of the improved friction clutch or the entire friction clutch in various torque transmitting systems which are described and shown in the prior art referred to in numerous preceding passages of this specification. In addition, the improved friction clutch can be modified, completed and/or improved in numerous additional ways. For example, the clutch can be equipped with additional resilient means in order to linearize or to further linearize the curve denoting the disengaging force which is necessary to move the pressure plate axially and away from the counterpressure plate of the clutch. Such additional resilient means are disclosed, for example, in the unpublished German patent application Serial No. P 44 18 026.8.

It is equally within the purview of the invention to provide the improved friction clutch with energy storing elements which facilitate or further facilitate the engagement and/or the disengagement of the clutch. Reference may be had, for example, to the unpublished German patent application Serial No. P 44 10 837.0.

Still further, it is possible to combine or to utilize the improved friction clutch with a disengaging arrangement of the type disclosed, for example, in the published German patent application No. 43 22 677. An advantage of such disengaging arrangement is that it can limit the extent of movement of the tips 12a of the prongs 12 forming part of the diaphragm spring or clutch spring 4 of FIGS. 1 and 2 in a direction to disengage the friction clutch 1.

It is further clear that various features of the embodiments shown in FIGS. 1-2, 4 and 9-10 (as well as of the merely described but not illustrated embodiments) can be combined with each other in a number of ways without departing from the spirit of the invention. Still further, at least a certain number of individual elements or groups of two or more elements in the described and illustrated embodiments of the improved friction clutch are believed to constitute improvements which are novel and patentable per se.

A clutch spring which can be utilized with advantage in the friction clutch of the present invention to exhibit a degressive force-to-distance characteristic at least during one or more selected stages of disengagement of the friction clutch is disclosed, for example, in the aforementioned published German patent application No. 42 39 289.

The sections of the resilient device (such as 13, 13' or 113) are also susceptible of numerous additional modifications. For example, the sections and/or their portions can be configurated and dimensioned in such a way that the moment of resistance against bending or flexing of the sections varies in a direction radially of and between the annular main portion of the clutch spring and the axis of the clutch housing. This can be readily achieved by appropriately varying the cross-sectional area of each section or of certain sections in directions radially inwardly from the main portion of the clutch spring. Such configuration of the sections of the resilient device renders it possible to ensure that the elastical deformation (i.e., the ability to withstand bending stresses) of each section is at least substantially uniform all the way between the radially innermost and the radially outermost parts of each section or each of a selected group of sections.

The provision of tips 18 of portions 16 of the sections of the resilient device 13 with convex surfaces 18a exhibits the advantage that the area of contact between each tip 18 and the respective ramp 20 of the housing 2 is reduced accordingly. Such configuration of the tips 18 constitutes a desirable and advantageous but optional feature of the spring 4 and its resilient device 13.

It is further clear that all sections of the resilient device 13, 13' or 113 (or an analogous resilient device) need not be identical or even similar. Thus, and by way of example only, the resilient device 13 can be modified to include a set of sections of the type shown in FIG. 4 as well as a set of sections of the type shown in FIG. 4a. In fact, it is often preferred to employ resilient devices having two or more different types of sections which are designed to engage ramps provided on or merely borne by the housing of the friction clutch.

The ramps 20 or 120 can be said to form part of the wear compensating unit of the improved friction clutch. The same holds true for the ramps 24 27 and their equivalents.

The manner in which the primary flywheel or mass (such as 61 shown in FIG. 2) can be affixed to an output element of a prime mover, and the manner in which the hub of the clutch disc or clutch plate can be non-rotatably coupled with an input element (such as to the input shaft of a variable-speed transmission in a motor vehicle), are disclosed in numerous United States Letters Patent and in numerous foreign patents of the assignee of the present application.

The disclosures of all prior publications which are identified in the specification of the present application, as well as of all corresponding United States Letters Patent and/or still pending United States patent applications are incorporated herein by reference.

Without further analysis, the foregoing will so fully reveal the gist of the present invention that others can, by applying current knowledge, readily adapt it for various applications without omitting any of those features which, from the standpoint of prior art, fairly constitute the essential characteristics of the generic and specific aspects of the aforedescribed contribution to the art and, therefore, such adaptations should and are intended to be comprehended within the meaning and range of equivalence of the appended claims.

What is claimed is:

1. An engageable and disengageable friction clutch, comprising a housing rotatable about a predetermined axis; a counterpressure plate coaxial and rotatable with said housing; a pressure plate coaxial and rotatable with said housing, interposed between said counterpressure plate and said housing and having limited freedom of axial movement relative to said housing; a clutch disc having friction linings disposed between said plates and being subject to wear as a result of repeated engagement and disengagement of the clutch; a clutch spring interposed between said pressure plate and a seat assembly on said housing to clamp said friction linings between said plates in the engaged condition of the clutch; means for automatically compensating for wear upon said friction linings including means for moving said spring axially of and relative to said housing; and resilient means fixedly secured to said spring and operative to urge said spring against said seat assembly.

2. The clutch of claim 1, wherein at least a portion of said resilient means is of one piece with said spring.

3. The clutch of claim 1, wherein said seat assembly comprises a fulcrum and said spring is tiltable relative to said fulcrum, said fulcrum forming part of said compensating means and said moving means including means for repeatedly advancing said fulcrum and said spring toward said counterpressure plate through distances dependent upon the extent of wear upon said friction linings.

4. The clutch of claim 1, further comprising means for disengaging the clutch against the opposition of said resilient means.

5. The clutch of claim 1, wherein said spring is installed between said seat assembly and said pressure plate with a degressive characteristic curve within an operating range thereof.

6. The clutch of claim 1, wherein said spring has a conicity which changes at least during disengagement of the clutch as well as in the absence of axial movement in response to wear upon said friction linings, said resilient means being operative to urge said spring against said seat assembly with a first force exceeding a second force generated by said spring as a result of a change of conicity during disengagement of the clutch, said second force exceeding said first force during a portion at least of a change of conicity of said spring as a result of wear upon said friction linings.

7. The clutch of claim 1, wherein said resilient means includes a plurality of elongated portions.

8. The clutch of claim 1, wherein said spring includes an energy storing annular main portion and said resilient means is of one piece with said main portion.

9. The clutch of claim 8, wherein said main portion includes a radially inner marginal portion and said resilient means includes a plurality of elongated portions of one piece with said marginal portion.

10. The clutch of claim 1, wherein said spring includes an elastically deformable annular main portion and said resilient means includes a plurality of sections each having a first portion extending from said main portion substantially toward said axis, a second portion extending substantially radially outwardly from said axis, and an intermediate portion between the respective first and second portions and spaced apart from said main portion radially inwardly toward said axis.

11. The clutch of claim 1, wherein said resilient means comprises a plurality of substantially hairpin-shaped sections.

12. The clutch of claim 1, wherein said spring comprises an annular main portion and a plurality of prongs extending from said main portion substantially radially inwardly toward said axis, said resilient means including sections alternating with at least some of said prongs in a circumferential direction of said main portion.

13. The clutch of claim 12, further comprising means for engaging and disengaging the clutch, said engaging and disengaging means including portions of said prongs.

14. The clutch of claim 12, wherein said prongs include a plurality of groups spaced apart from each other in said circumferential direction of said main portion and said sections of said resilient means alternate with said groups.

15. The clutch of claim 14, wherein at least some of said groups include between two and four prongs.

16. The clutch of claim 14, wherein at least some of said groups comprise three prongs each.

17. The clutch of claim 12, wherein said spring has slots between said at least some prongs and the respective sections of said resilient means.

18. The clutch of claim 1, wherein said spring includes an annular main portion and said resilient means includes a plurality of sections each having a first portion extending from said main portion substantially radially toward said axis, a second portion extending substantially radially outwardly from said axis, and a slot between the first and second portions.

19. The clutch of claim 1, wherein said resilient means includes a plurality of sections each having a first portion extending from a main portion of said spring substantially radially inwardly toward said axis and a second portion extending from said axis substantially radially outwardly and having an enlarged free end portion remote from said axis.

20. The clutch of claim 1, wherein said resilient means comprises a plurality of sections each including first and second tongues extending from an annular main portion of said spring substantially radially inwardly toward said axis and spaced apart from each other in a circumferential direction of said main portion, each of said sections further including a third tongue disposed between the respective first and second tongues and extending substantially radially outwadly toward said main portion, each of said first and second tongues having a radially inner end portion merging into a radially inner end portion of the respective third tongue.

21. The clutch of claim 1, wherein said resilient means includes trimmed portions of a converted metallic blank constituting said spring.

22. The clutch of claim 1, wherein said housing has a first side facing toward and a second side facing away from said spring, said resilient means including a plurality of stressed sections having free end portions bearing against the second side of said housing.

23. The clutch of claim 1, wherein said resilient means comprises a plurality of sections which are elastically deformed in the direction of said axis.

24. The clutch of claim 1, further comprising a bayonet mount connection between said spring and said housing.

25. The clutch of claim 1, wherein said housing has windows for portions of said resilient means.

26. The clutch of claim 1, wherein said housing has ramps and said resilient means includes sections having end portions engaging said ramps.

27. The friction clutch of claim 1, wherein said counterpressure plate and said clutch disc constitute component parts of a power train in a motor vehicle.

28. A diaphragm spring, comprising an annular main portion; a plurality of prongs extending substantially radially inwardly from said main portion and together forming a plurality of groups spaced apart from each other in a circumferential direction of said main portion; and resilient means including sections alternating with said groups in said circumferential direction and each including a first portion extending substantially radially inwardly from said main portion, a second portion extending substantially radially outward toward but being devoid of a connection with said main portion, and an intermediate portion connecting a radially inner end portion of the first portion with a radially inner end portion of the second portion.

29. The diaphragm spring of claim 28, wherein said main portion has a radially inner marginal portion and each of said second portions includes a radially outer end portion adjacent said marginal portion.

30. The diaphragm spring of claim 28, wherein said main portion is engageable with a pressure plate of a friction clutch.

* * * * *